United States Patent
Nagano et al.

(10) Patent No.: US 10,908,353 B2
(45) Date of Patent: Feb. 2, 2021

(54) OPTICAL FIBER AND SLANTED FIBER GRATING

(71) Applicant: SUMITOMO ELECTRIC INDUSTRIES, LTD., Osaka (JP)

(72) Inventors: Shigehiro Nagano, Osaka (JP); Manabu Shiozaki, Osaka (JP); Jun Kinugasa, Osaka (JP); Takemi Hasegawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/192,833

(22) Filed: Nov. 16, 2018

(65) Prior Publication Data

US 2019/0154912 A1 May 23, 2019

(30) Foreign Application Priority Data

Nov. 17, 2017 (JP) ................. 2017-221696

(51) Int. Cl.
*G02B 6/02* (2006.01)
*G02B 6/028* (2006.01)
*G02B 6/036* (2006.01)

(52) U.S. Cl.
CPC ....... *G02B 6/02085* (2013.01); *G02B 6/0283* (2013.01); *G02B 6/02114* (2013.01); *G02B 6/03627* (2013.01)

(58) Field of Classification Search
CPC ............ G02B 6/02076; G02B 6/02085; G02B 6/02114; G02B 6/0283; G02B 6/03627
See application file for complete search history.

(56) References Cited

U.S. PATENT DOCUMENTS

| 6,009,222 | A | * | 12/1999 | Dong | ................. | G02B 6/021 385/127 |
| 6,104,852 | A | * | 8/2000 | Kashyap | ................. | G02B 6/021 385/122 |
| 6,842,566 | B2 | * | 1/2005 | Ishikawa | ................. | G02B 6/021 385/123 |
| 6,859,585 | B1 | * | 2/2005 | De Barros | ......... | G02B 6/02119 385/123 |

(Continued)

FOREIGN PATENT DOCUMENTS

| EP | 1 500 959 A1 | 1/2005 |
| JP | 2003-4926 A | 1/2003 |
| WO | WO-03/093887 A1 | 11/2003 |

*Primary Examiner* — Daniel Petkovsek
(74) *Attorney, Agent, or Firm* — Faegre Drinker Biddle & Reath LLP

(57) ABSTRACT

An optical fiber is made of silica-based glass and includes a core, a first cladding that surrounds the core and that has a refractive index lower than a refractive index of the core; and a second cladding that surrounds the first cladding and that has a refractive index lower than the refractive index of the core and higher than the refractive index of the first cladding. At least a part of the first cladding contains a photosensitive material whose refractive index increases by irradiation with light having a specific wavelength. A difference $\Delta n$ between a refractive index of a portion of the first cladding, the portion being nearest to the core, and the refractive index of the core is in a range of 0.25% to 0.30%. The radius ra of the core is larger than 4.3 μm and smaller than or equal to 5.0 μm.

6 Claims, 16 Drawing Sheets

(56) References Cited

U.S. PATENT DOCUMENTS

| | | | |
|---|---|---|---|
| 7,203,399 B2* | 4/2007 | Ishikawa | G02B 6/02085 385/123 |
| 8,666,214 B2* | 3/2014 | Bookbinder | G02B 6/028 385/124 |
| 8,934,508 B2* | 1/2015 | Sakamoto | G02B 6/02138 372/6 |
| 8,953,917 B2* | 2/2015 | Berkey | G02B 6/028 385/127 |
| 9,995,874 B2* | 6/2018 | Bookbinder | G02B 6/02395 |
| 10,094,975 B2* | 10/2018 | Bookbinder | G02B 6/02009 |
| 2002/0118939 A1* | 8/2002 | Taru | C03B 37/01413 385/127 |
| 2010/0195966 A1* | 8/2010 | Bickham | C03C 13/046 385/128 |
| 2011/0058780 A1* | 3/2011 | Han | C03B 37/018 385/124 |

* cited by examiner

FIG. 9

| CONDITION # | | Δb+α [%] | Type 1 | | | Type 2 | | |
|---|---|---|---|---|---|---|---|---|
| | | | rb [μm] | Δb [%] | Δd [%] | rb [μm] | Δb [%] | Δd [%] |
| 1 | A GROUP | 0.000 | 14.000 | -0.350 | -0.030 | 14.200 | -0.300 | 0.040 |
| 2 | | 0.000 | 14.000 | -0.350 | -0.130 | 14.200 | -0.300 | -0.060 |
| 3 | | 0.000 | 14.000 | -0.350 | -0.230 | 14.200 | -0.300 | -0.160 |
| 4 | | 0.000 | 14.000 | -0.250 | -0.030 | 14.200 | -0.220 | 0.040 |
| 5 | | 0.000 | 14.000 | -0.250 | -0.130 | 14.200 | -0.220 | -0.060 |
| 6 | | 0.000 | 14.000 | -0.250 | -0.230 | 14.200 | -0.220 | -0.160 |
| 7 | | 0.000 | 14.000 | -0.135 | -0.030 | 14.200 | -0.135 | 0.040 |
| 8 | | 0.000 | 14.000 | -0.135 | -0.130 | 14.200 | -0.135 | -0.060 |
| 9 | | 0.000 | 14.000 | -0.135 | -0.230 | 14.200 | -0.135 | -0.160 |
| 10 | | 0.000 | 17.550 | -0.350 | -0.030 | 19.800 | -0.300 | 0.040 |
| 11 | | 0.000 | 17.550 | -0.350 | -0.130 | 19.800 | -0.300 | -0.060 |
| 12 | | 0.000 | 17.550 | -0.350 | -0.230 | 19.800 | -0.300 | -0.160 |
| 13 | | 0.000 | 17.550 | -0.250 | -0.030 | 19.800 | -0.220 | 0.040 |
| 14 | | 0.000 | 17.550 | -0.250 | -0.130 | 19.800 | -0.220 | -0.060 |
| 15 | | 0.000 | 17.550 | -0.250 | -0.230 | 19.800 | -0.220 | -0.160 |
| 16 | | 0.000 | 17.550 | -0.135 | -0.030 | 19.800 | -0.135 | 0.040 |
| 17 | | 0.000 | 17.550 | -0.135 | -0.130 | 19.800 | -0.135 | -0.060 |
| 18 | | 0.000 | 17.550 | -0.135 | -0.230 | 19.800 | -0.135 | -0.160 |

FIG. 10

| CONDITION # | | $\Delta b + \alpha$ [%] | Type 1 | | | Type 2 | | |
|---|---|---|---|---|---|---|---|---|
| | | | rb [μm] | Δb [%] | Δd [%] | rb [μm] | Δb [%] | Δd [%] |
| 19 | | 0.250 | 14.000 | -0.350 | -0.030 | 14.200 | -0.300 | 0.040 |
| 20 | | 0.250 | 14.000 | -0.350 | -0.130 | 14.200 | -0.300 | -0.060 |
| 21 | | 0.250 | 14.000 | -0.350 | -0.230 | 14.200 | -0.300 | -0.160 |
| 22 | | 0.250 | 14.000 | -0.250 | -0.030 | 14.200 | -0.220 | 0.040 |
| 23 | | 0.250 | 14.000 | -0.250 | -0.130 | 14.200 | -0.220 | -0.060 |
| 24 | | 0.250 | 14.000 | -0.250 | -0.230 | 14.200 | -0.220 | -0.160 |
| 25 | | 0.250 | 14.000 | -0.135 | -0.030 | 14.200 | -0.135 | 0.040 |
| 26 | | 0.250 | 14.000 | -0.135 | -0.130 | 14.200 | -0.135 | -0.060 |
| 27 | | 0.250 | 14.000 | -0.135 | -0.230 | 14.200 | -0.135 | -0.160 |
| 28 | B GROUP | 0.250 | 17.550 | -0.350 | -0.030 | 19.800 | -0.300 | 0.040 |
| 29 | | 0.250 | 17.550 | -0.350 | -0.130 | 19.800 | -0.300 | -0.060 |
| 30 | | 0.250 | 17.550 | -0.350 | -0.230 | 19.800 | -0.300 | -0.160 |
| 31 | | 0.250 | 17.550 | -0.250 | -0.030 | 19.800 | -0.220 | 0.040 |
| 32 | | 0.250 | 17.550 | -0.250 | -0.130 | 19.800 | -0.220 | -0.060 |
| 33 | | 0.250 | 17.550 | -0.250 | -0.230 | 19.800 | -0.220 | -0.160 |
| 34 | | 0.250 | 17.550 | -0.135 | -0.030 | 19.800 | -0.135 | 0.040 |
| 35 | | 0.250 | 17.550 | -0.135 | -0.130 | 19.800 | -0.135 | -0.060 |
| 36 | | 0.250 | 17.550 | -0.135 | -0.230 | 19.800 | -0.135 | -0.160 |

OPTICAL FIBER AND SLANTED FIBER GRATING

BACKGROUND OF THE INVENTION

Field of the Invention

The present invention relates to an optical fiber and a slanted fiber grating.

Description of the Related Art

In a long-haul optical fiber communication system using signal light in the C-band or the L-band, an optical fiber amplifier, which includes an amplifying optical fiber doped with a rare-earth element such as erbium (Er), is used as an optical amplifier for amplifying the signal light. The gain of the erbium-doped fiber amplifier (EDFA) has wavelength dependency, and has a peak near the wavelength of 1.53 µm. Due to the non-flatness of the wavelength dependency of the gain spectrum, increase in bit error rate occurs, and, as a result, the performance of a transmission system decreases. As a component for solving this problem, a slanted fiber grating (SFG), which is a gain-flattening filter for flattening the gain of the EDFA, has been developed.

Production examples of a gain-flattening filter are described in JP2003-4926A and WO03/093887A. By irradiating an optical fiber, in which both or one of the core and the cladding are/is made of silica-based glass containing a photosensitive material (such as $GeO_2$ or $B_2O_3$), with ultraviolet light having a specific wavelength that can increase the refractive index (such as the second harmonic of argon ion laser light (wavelength 244 nm)), it is possible to increase the refractive index of silica-based glass including the photosensitive material. Examples of a method for writing a refractive index modulated grating, having a predetermined period, in an optical fiber include the following: exposure using ±1st-order diffracted light using a chirp grating phase mask; UV laser light direct exposure; and two-beam interference exposure. Among these, the method using a phase mask has advantages in that gratings having the same characteristics can be produced with high repeatability and alignment is relatively easy compared with other methods.

Loss due to a SFG is formed by coupling from the $LP_{01}$ mode to a higher-order backward propagation mode. As illustrated in FIG. 1, the loss waveform of a SFG which includes a grating written by using light having a certain beam width and a specific wavelength, has a fundamental waveform that has a peak loss at a certain wavelength, that has a certain full width at half maximum (FWHM), and in which the loss gradually decreases from the peak wavelength toward the short-wavelength side. As illustrated in FIG. 2, a desirable loss waveform of a gain-flattening filter is realized by superposing a plurality of fundamental waveforms having different peak wavelengths. The gain of an EDFA is flattened by using a gain-flattening filter having a loss waveform in which a plurality of fundamental waveforms are superposed in this way.

SUMMARY OF THE INVENTION

It is an object of the present invention to provide an optical fiber that is suitable for producing a SFG that can realize a high-performance gain-flattening filter.

To achieve the object, there is provided an optical fiber composed of silica based glass and including a core that includes a central axis of the optical fiber and that has a radius ra that is larger than 4.3 µm and smaller than or equal to 5.0 µm; a first cladding that is in contact with the core, that surrounds the core, that has an outer radius rb, and that has a refractive index lower than a refractive index of the core; and a second cladding that is in contact with the first cladding, that surrounds the first cladding, and that has a refractive index lower than the refractive index of the core and higher than the refractive index of the first cladding. In the optical fiber, at least a part of the first cladding contains a photosensitive material whose refractive index increases by irradiation with light. The radius ra is a position where a gradient of a refractive index in a direction away from the central axis along a straight line perpendicular to the central axis is negative and maximum. In a graph in which the straight line perpendicular to the central axis is a horizontal axis and the refractive index is a vertical axis, a difference between a value that an extension of a straight line connecting a refractive index at a position ra+1 µm and a refractive index at a position rb−1 µm takes at a position ra and a maximum value of the refractive index of the core is in a range of 0.25% to 0.30% as a difference in relative refractive index.

In the optical fiber according to the present invention, preferably, the photosensitive material is $GeO_2$; and, also preferably, the photosensitive material is $B_2O_3$. Preferably, the first cladding and the second cladding each contain fluorine.

As another aspect of the present invention, there is provided a slanted fiber grating including a Bragg grating in at least a partial region in an optical fiber in a direction of a central axis, the optical fiber being made of silica-based glass, the Bragg grating being inclined relative to the central axis. In the slanted fiber grating, the optical fiber includes a core, a first cladding that surrounds the core and that has a refractive index lower than a refractive index of the core, and a second cladding that surrounds the first cladding and that has a refractive index lower than the refractive index of the core and higher than the refractive index of the first cladding; at least a part of the first cladding contains a photosensitive material whose refractive index increases by irradiation with light having a specific wavelength; a difference between a refractive index of a portion of the first cladding, the portion being nearest to the core, and the refractive index of the core is in a range of 0.25% to 0.30% as a difference in relative refractive index; and a radius of the core is larger than 4.3 µm and smaller than 5.0 µm. The Bragg grating is formed in at least a partial region of the first cladding of the optical fiber.

An optical fiber according to the present invention is suitable for producing a SFG that can realize a high-performance gain-flattening filter.

BRIEF DESCRIPTION OF THE DRAWINGS

FIG. 9 is a table showing parameters of optical fibers.

FIG. 10 is a table showing parameters of optical fibers.

DESCRIPTION OF THE PREFERRED EMBODIMENTS

Figure 1:
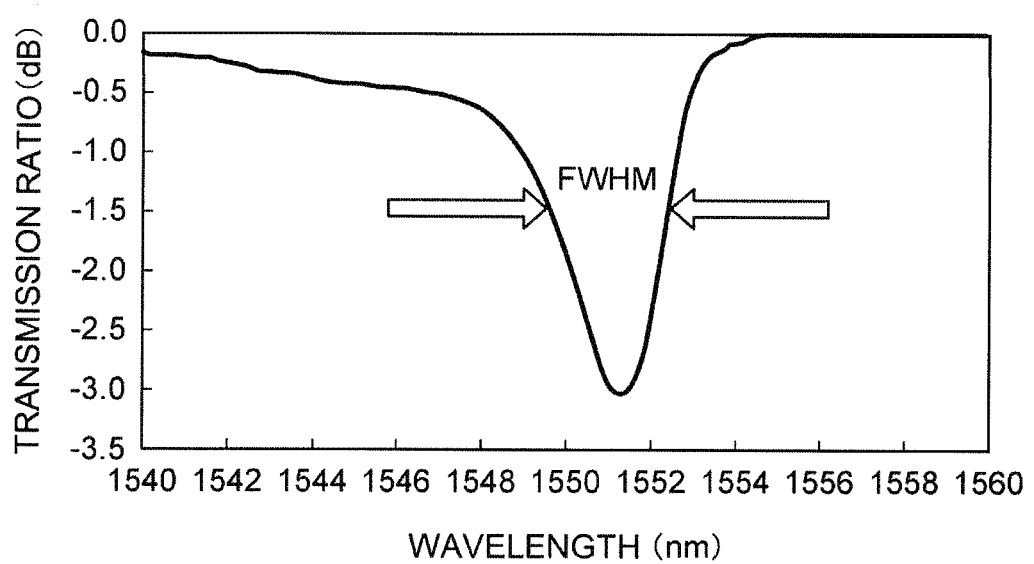
FIG. 1 is a graph illustrating the fundamental waveform in a loss waveform of a slanted fiber grating (SFG).
Figure 2:
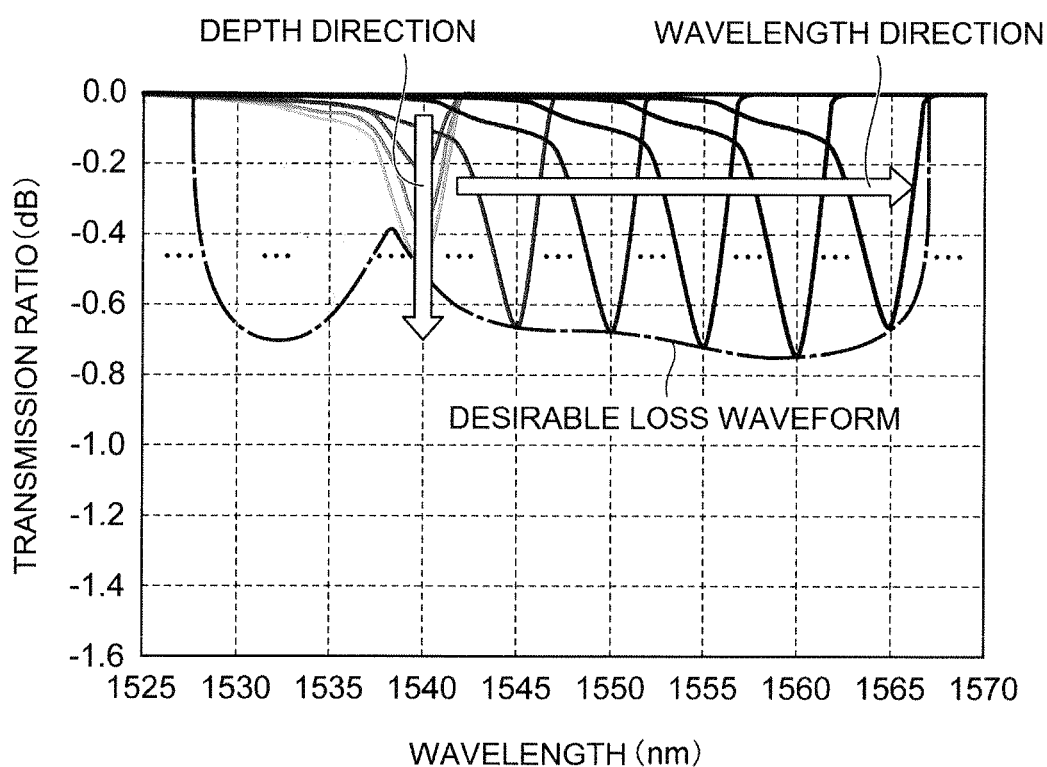
FIG. 2 is a graph illustrating superposition of a plurality of fundamental waveforms in a loss waveform of a SFG.

Hereinafter, embodiments of the present invention will be described in detail with reference to the drawings. In the drawings, the same elements will be denoted by the identical numerals, and redundant descriptions will be omitted. The present invention is not limited to these examples, and it is intended that the present invention include any modifications within the scope of the claims and the equivalents thereof.

In recent years, as the internet on things (IoT) and utilization of big data have developed, increase of transmission capacity and further reduction of bit error rate are required, and increase in the performance of a gain-flattening filter using a slanted fiber grating (SFG) is required. However, due to limitation on the full width at half maximum (FWHM) of a fundamental waveform, even by superposing a plurality of fundamental waveforms, it is difficult to realize a desirable loss waveform with high precision.

In order to increase the performance of a gain-flattening filter, it is desirable to reduce the FWHM of the fundamental waveform of a SFG (reduce the bandwidth of the fundamental waveform). In order to reduce the bandwidth of the fundamental waveform, it is easy to use a method of reducing the angle of the equi-refractive-index plane of a grating relative to a wave front of propagation of light of $LP_{01}$ (angle of the grating). When the light propagation wave front of $LP_{01}$ and the equi-refractive-index plane of the grating coincide with each other, the FWHM has the minimum value.

Figure 3:
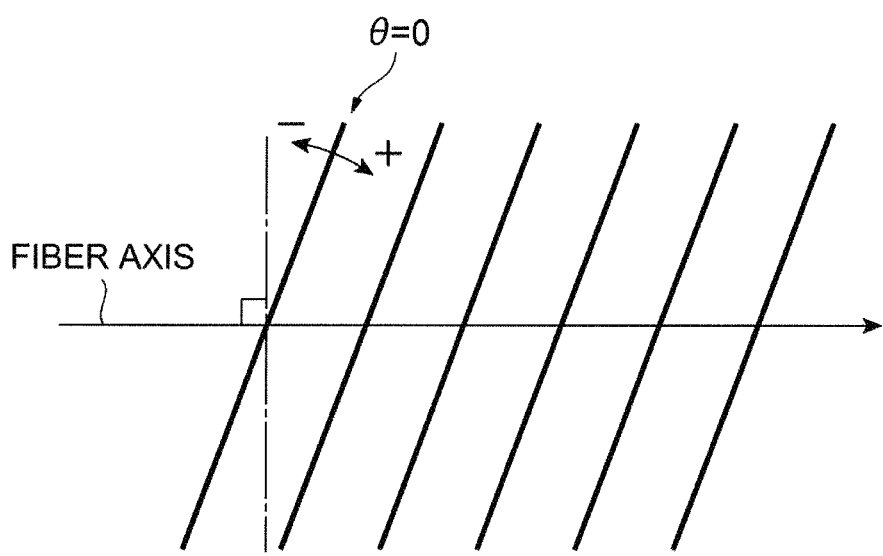
FIG. 3 is a conceptual diagram illustrating a slant angle θ.
Figure 4:
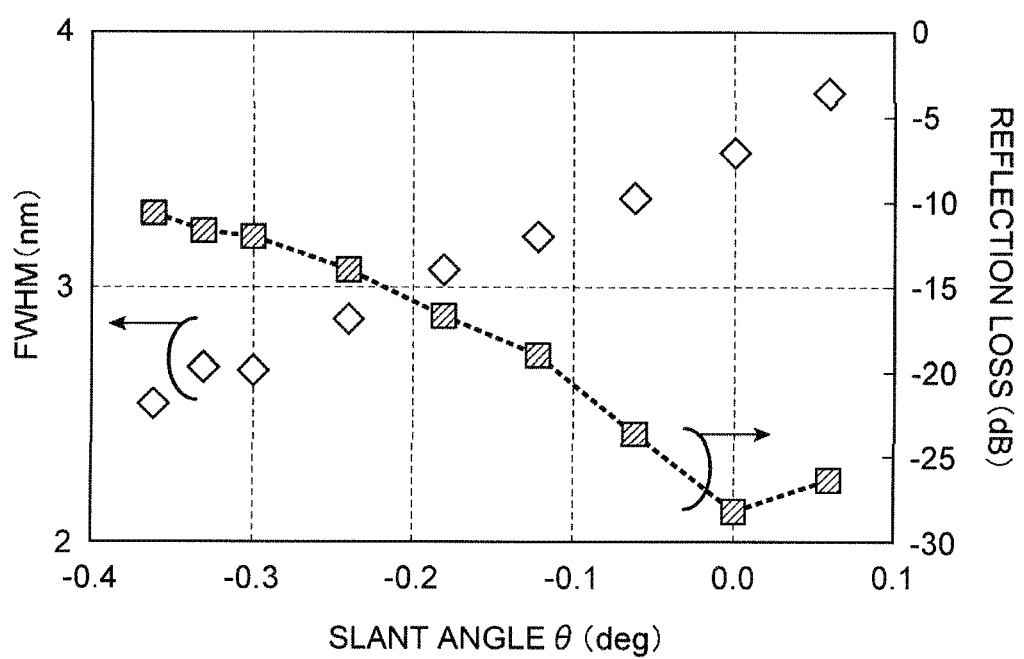
FIG. 4 is a graph illustrating the relationship among the full width at half maximum (FWHM) of the fundamental waveform, the reflection loss, and the slant angle θ of a SFG.

FIG. 3 is a conceptual diagram illustrating a slant angle θ, in which a grating is shown by a plurality of lines at equal distances. As the angle of the grating increases, return light is suppressed (reflection loss increases). There exists an angle at which return light is maximally suppressed, and, as the angle of the grating is increased further, return light increases again (FIG. 4). The slant angle θ is defined so that the angle at which return light is maximally suppressed is the origin. A slant angle θ=0 corresponds to an angle of the grating of about 1° to 3°. As return light increases, light returns to an erbium-doped fiber (EDF) of the EDFA, thereby leading to, for example, decrease of the amplification efficiency/noise characteristic and decrease of the transmission quality. Therefore, the limit of the angle of the grating is about −0.1 degrees as a slant angle.

In order to reduce the bandwidth of the fundamental waveform of a SFG, it is effective to move an equi-refractive-index plane that realizes a slant angle θ=0 closer to the wave front of light propagation. As will be described in detail in paragraphs below with reference to FIGS. 11 and 12, in order to reduce the slant angle θ, it is necessary to increase the mode field diameter (MFD), and, from the viewpoint of the optical fiber structure, it is necessary to make the core radius larger than 4.3 μm. However, when the core radius is increased, the amount of leakage of light to the optical cladding decreases, and loss formation by ultraviolet irradiation (referred to as "writing ability" in the present specification) considerably decreases. Thus, in order to maintain high writing ability, it is necessary to increase the amount of leakage of light to the optical cladding even when the core radius is increased.

The fundamental waveform of a SFG can be obtained by calculating the coupling coefficient between the $LP_{01}$ mode and a higher-order $LP_{lm}$ mode. The displacement Δλ of the Bragg wavelength for each mode can be represented by the following expression (1):

$$\Delta\lambda = \Delta\lambda_0 \frac{\beta_{1m}(\lambda_0) - \beta_{01}(\lambda_0)}{\beta_{1m}(\lambda_0) + \beta_{01}(\lambda_0)}. \tag{1}$$

$\beta_{lm}(\lambda_0)$ is the propagation constant of the $LP_{lm}$ mode at a wavelength $\lambda_0$. $\beta_{01}(\lambda_0)$ is the propagation constant of the $LP_{01}$ mode at the wavelength $\lambda_0$.

Loss for the wavelength was obtained from the square of each of discrete coupling coefficients, which are dependent on Δλ. The width of the wavelength λ used for calculation was 0.02 nm. Regarding values between the squares of the coupling coefficients, a Gaussian distribution was provided to each of $\Delta\lambda_1$, $\Delta\lambda_2$, $\Delta\lambda_3$, . . . , and the values were interpolated.

Figure 5:
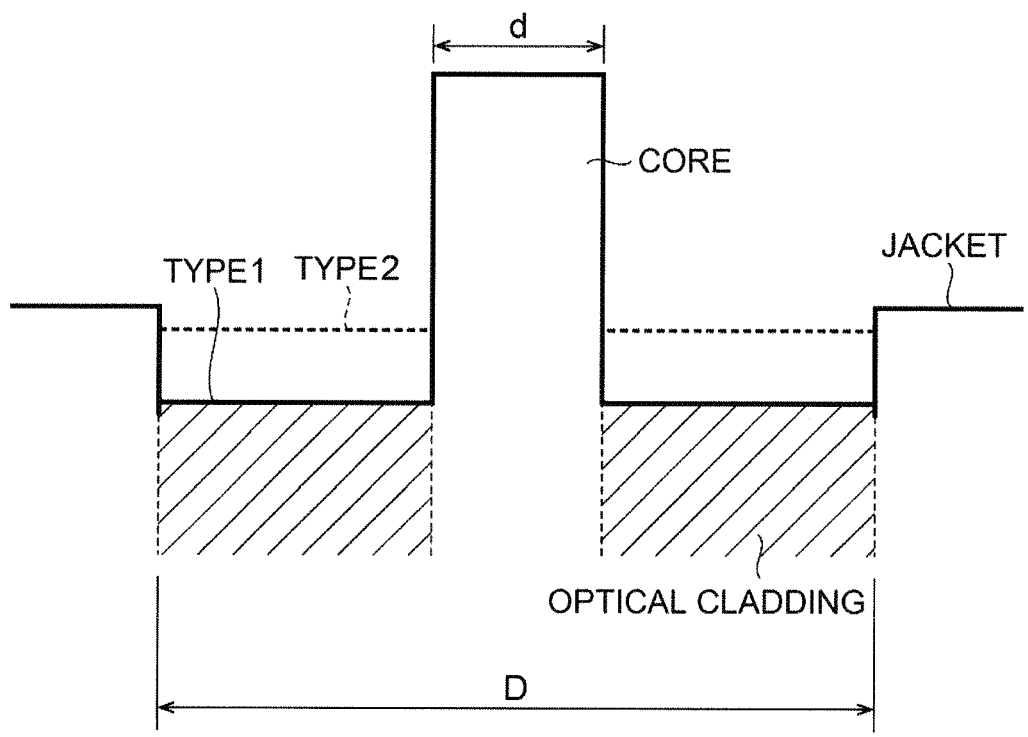
FIG. 5 is a conceptual diagram illustrating the refractive index profile of an optical fiber along a straight line perpendicular to the central axis.

FIG. 5 is a conceptual diagram illustrating the refractive index profile of an optical fiber along a straight line perpendicular to the central axis. The optical fiber, which is made of silica-based glass, includes a core, a first cladding (optical cladding) that surrounds the core and that has a refractive index lower than the refractive index of the core, a second cladding (jacket) that surrounds the first cladding and that has a refractive index lower than the refractive index of the core and higher than the refractive index of the first cladding. At least a part of the optical cladding contains a photosensitive material ($GeO_2$ or $B_2O_3$) whose refractive index increases by irradiation with light having a specific wavelength. The core and the jacket do not contain a photosensitive material. The optical cladding and the jacket contain fluorine.

Figure 6:
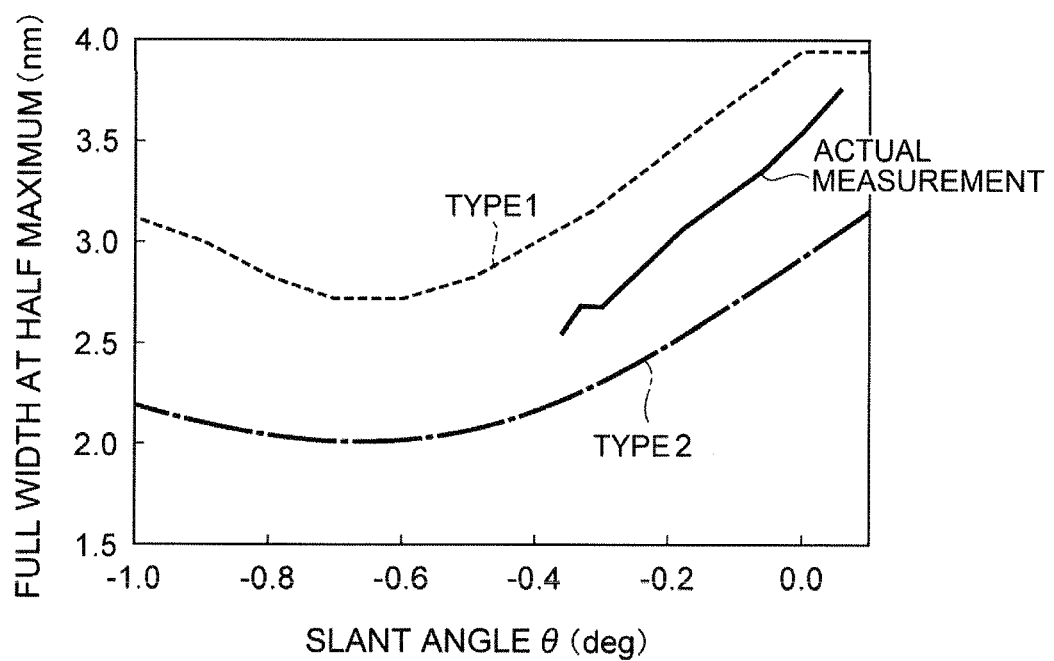
FIG. 6 is a graph illustrating the result of actually measuring the FWHM of the fundamental waveform of a SFG and the calculation results for optical fibers having refractive index profiles of type 1 and type 2.

The FWHMs of the fundamental waveform of a SFG obtained by using each of an optical fiber of type 1, which has a refractive index profile shown by a solid line in FIG. 5, and an optical fiber of type 2, which has a refraction index profile shown by a broken line in FIG. 5, were calculated. The refractive index profile of type 2 is the same as the refractive index profile of type 1 in the refractive indices of the core and the jacket but differs from the refractive index profile of type 1 in that the refractive index of the optical cladding is increased by 0.25%. FIG. 6 is a graph illustrating the results of calculated FWHMs of the fundamental waveforms of SFGs using optical fibers having the refractive index profiles of type 1 and type 2, and the result of actually measuring the FWHM of the fundamental waveform of an optical fiber that has a typical refractive index profile and in which a grating is written. The actually measured result is positioned between the calculation results based on the refractive index profiles of types 1 and 2. From this, it can be seen that the calculation results can be adjusted to the actually measured result by adjusting the effective refractive index of the optical cladding.

Figure 7:
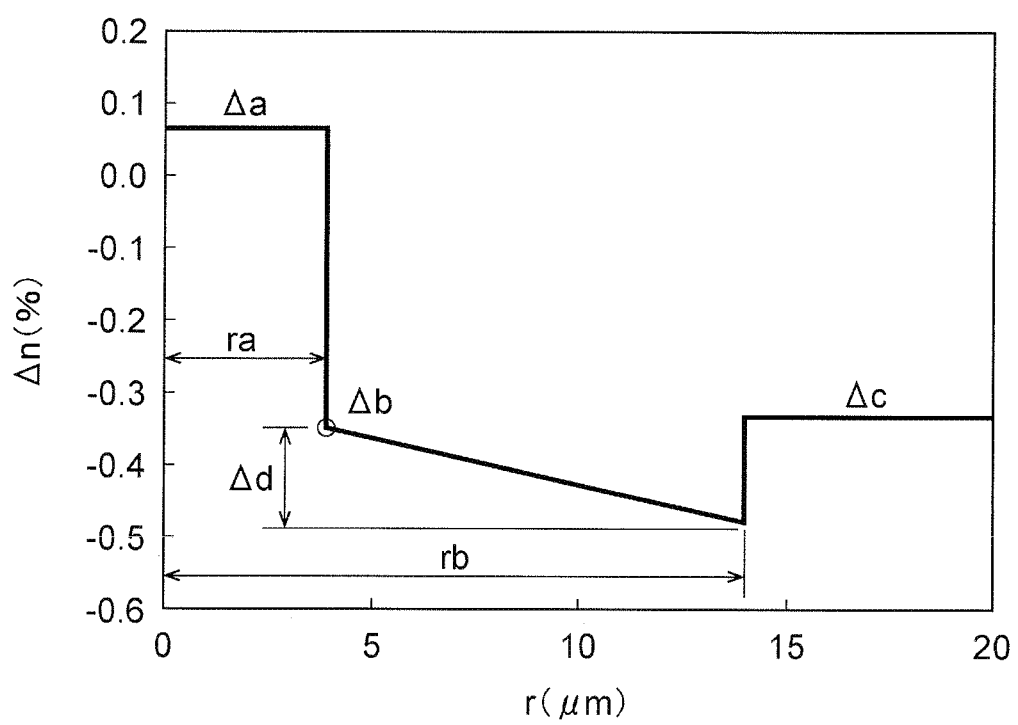
FIG. 7 is a graph illustrating the refractive index profile of an optical fiber of an analytical model along a straight line perpendicular to the central axis.

By using this analytic method, it is possible to obtain a design guideline for reducing the bandwidth of the fundamental waveform of a SFG. FIG. 7 is a graph illustrating the refractive index profile of an optical fiber of an analytic model, in which the horizontal axis represents the distance from the central axis of the optical fiber and the vertical axis represents the relative refractive index:

$$\Delta = \frac{(\text{refractive index of object}) - 1.444024}{1.444024}$$

relative to a refractive index of 1.444024. $\Delta a$ is the relative refractive index of the core. $\Delta b$ is the relative refractive index of a portion of the optical cladding (first cladding) nearest to the core. $\Delta c$ is the relative refractive index of the jacket (second cladding). $\Delta d$ is the difference between the relative refractive index of the portion of the optical cladding nearest to the core and the relative refractive index of a portion of the optical cladding nearest to the jacket. ra is the radius of the core. rb is the outer radius of the optical cladding.

Figure 8:
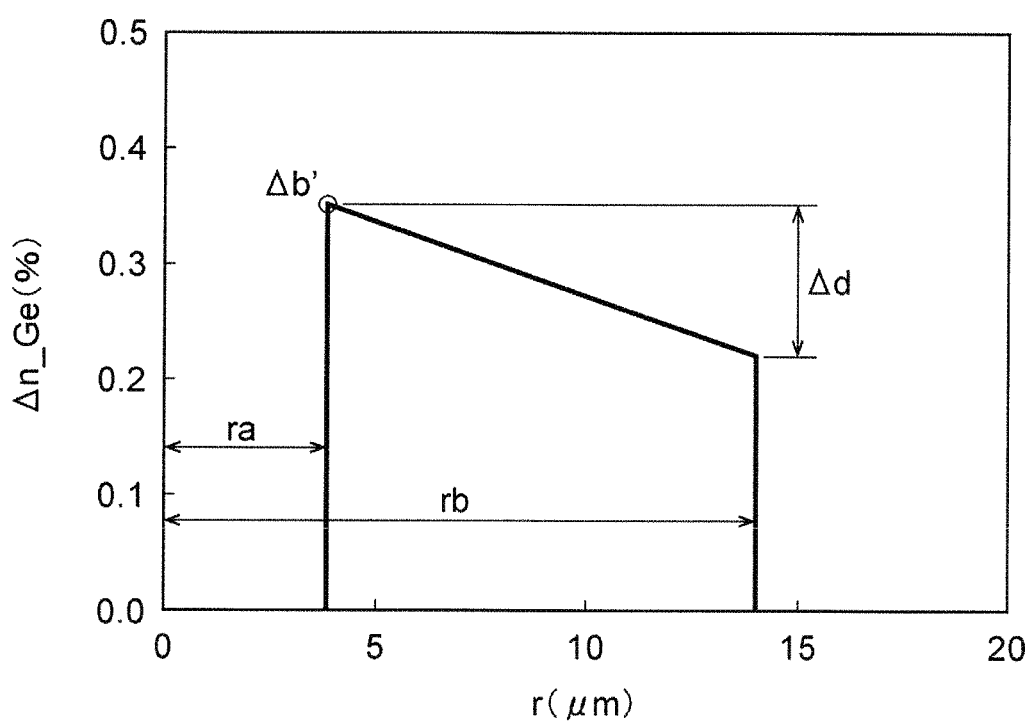
FIG. 8 is a graph illustrating the distribution of the Ge concentration of the optical fiber of the analytical model along a straight line perpendicular to the central axis.

FIG. 8 is a graph illustrating the distribution of Ge concentration on a straight line perpendicular to the central axis of the optical fiber of the analytical model as a corresponding amount of increase of relative refractive index. The dopants in the optical cladding are only fluorine and Ge, and the entire region of the optical cladding contains 0.7% of fluorine as expressed by using a relative refractive index. For example, in a case where the Ge concentration is 0.35% as expressed by using a relative refractive index, $\Delta b$ is −0.35%.

FIGS. 9 and 10 are tables showing the parameters of optical fibers for each of which the FWHM of the fundamental waveform was calculated. In the refractive index profile of type 1, $\Delta a$=0.065%, ra=3.9 μm, and $\Delta c$=−0.335%. In the refractive index profile of type 2, $\Delta a$=0.065%, ra=4.4 μm, and $\Delta c$=−0.300%. In each of types 1 and 2, rb was set to two values, $\Delta b$ was set to three values, and $\Delta d$ was set to three values; and the FWHM of the fundamental waveform, the angle of the grating at a slant angle=0, and the MFD were calculated. Compared with rb, $\Delta b$, and $\Delta d$, the contribution of $\Delta c$ to the FWHM of the fundamental waveform is smaller by an order of magnitude. Therefore, in the present calculation, the value of $\Delta c$ was fixed. Note that $\Delta c$ is a parameter that influences the bending loss and the cutoff wavelength. Adjustment of the cutoff wavelength by using $\Delta c$ will be described below.

Figure 11:
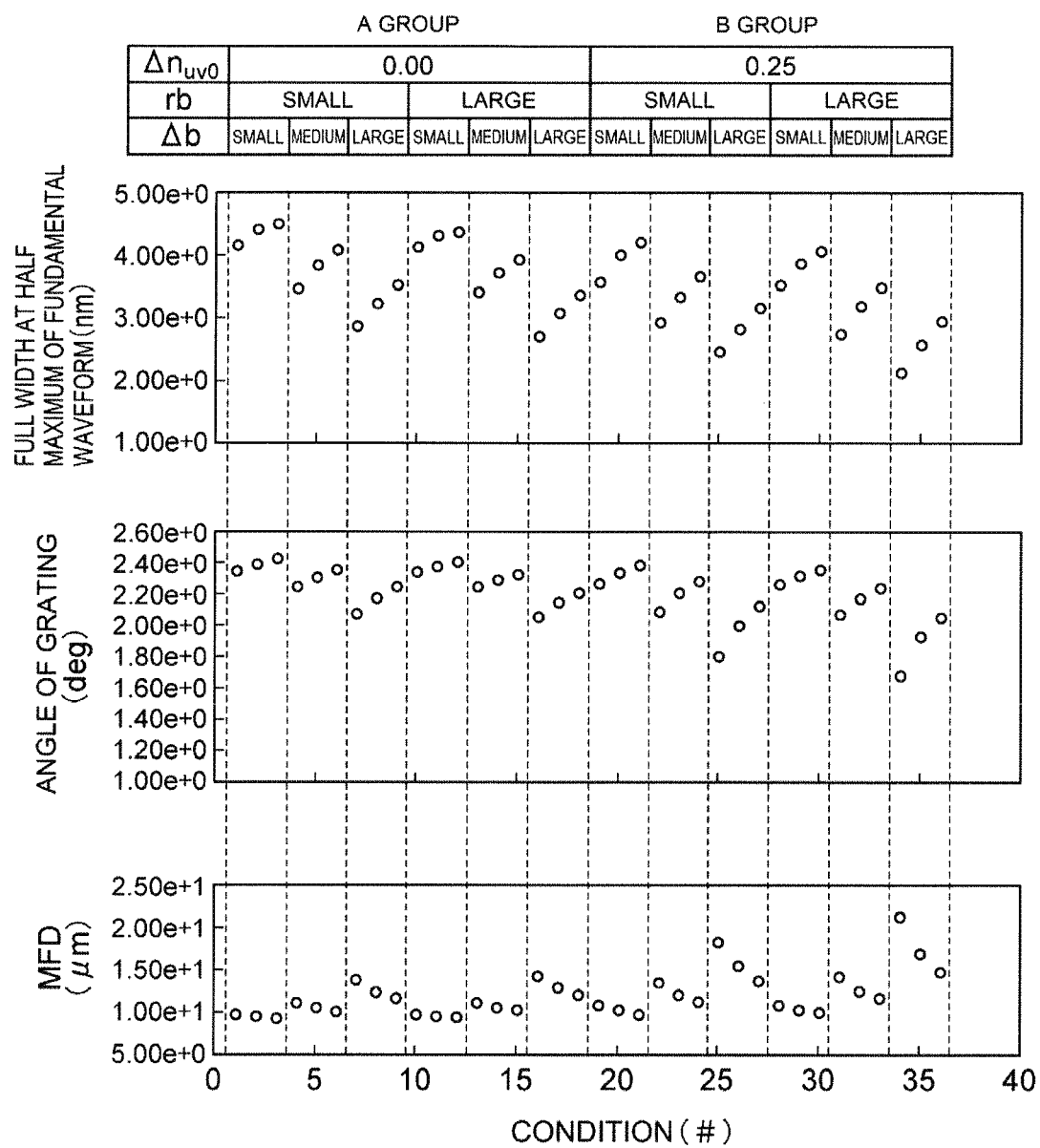
FIG. 11 is a graph illustrating the results of calculating the FWHM of the fundamental waveform, the angle of a grating at a slant angle=0, and the mode field diameter (MFD) of each of optical fibers having the refractive index profile of type 1.
Figure 12:
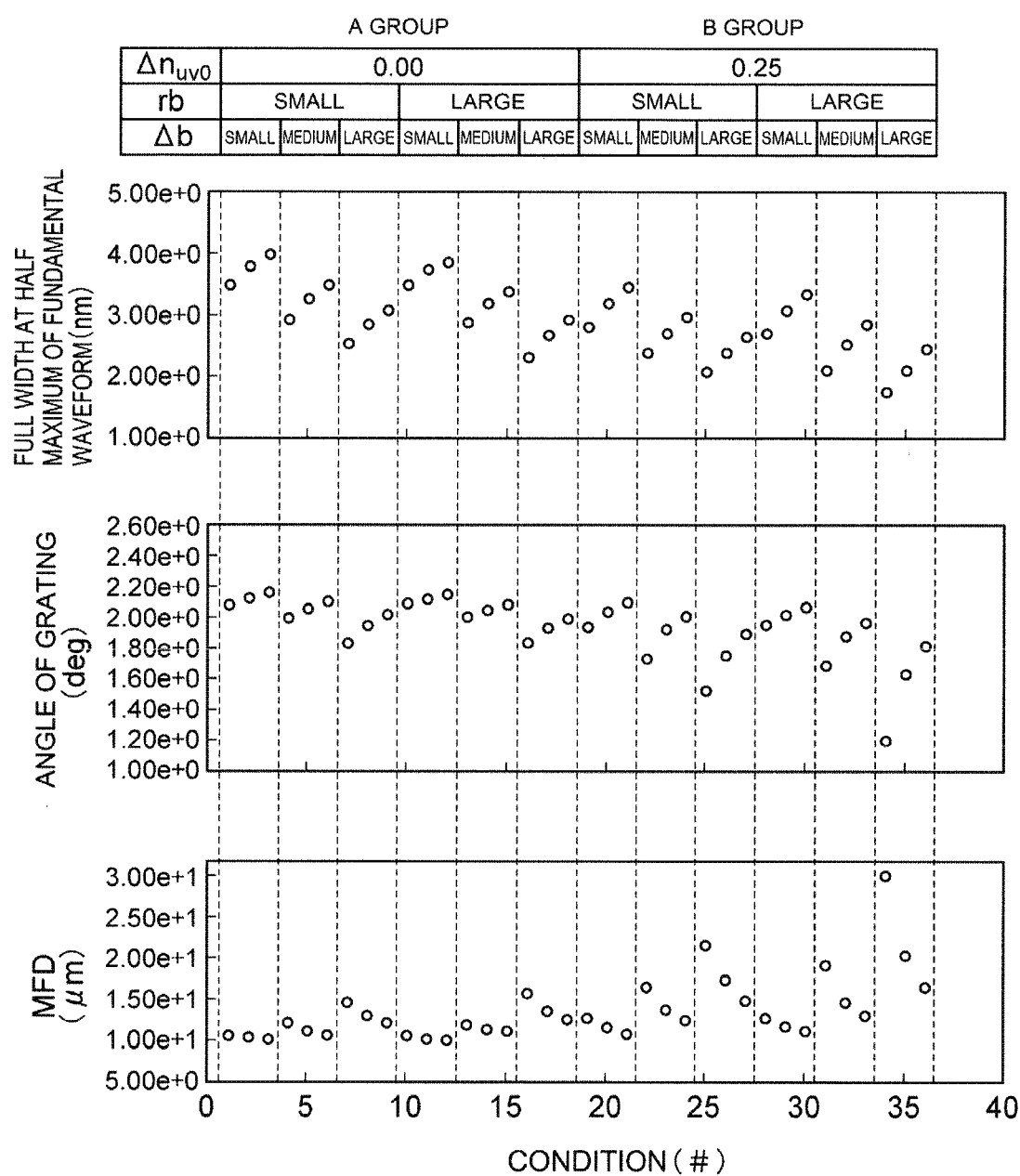
FIG. 12 is a graph illustrating the results of calculating the FWHM of the fundamental waveform, the angle of a grating at a slant angle=0, and the MFD of each of optical fibers having the refractive index profile of type 2.

FIG. 11 is a graph illustrating the calculation results obtained by performing calculations for the optical fibers having the refractive index profile of type 1. FIG. 12 is a graph illustrating the calculation results obtained by performing calculations for the optical fibers having the refractive index profile of type 2. In each of columns of these graphs, the calculation results are shown by arranging from the left side in order of conditions where $\Delta d$ is "large", "medium", and "small". As can be seen from the calculation results, the design guideline for reducing the bandwidth of the fundamental waveform is as follows. That is, for each of type 1 and type 2, it is possible to reduce the bandwidth of the fundamental waveform by reducing the angle of the grating at a slant angle=0 and by increasing the MFD. In order to increase the MFD, it is necessary that the core radius ra be large. This can be also confirmed from a comparison in that the core radius ra is 3.9 μm in the refractive index profile of type 1 and the core radius ra is 4.4 μm in the refractive index profile of type 2. However, in consideration of connection loss with another optical fiber, the upper limit of the MFD is 11 μm in the wavelength band of 1.55 μm.

The calculations described above are performed mainly for the purpose of reducing the bandwidth of the fundamental waveform. In addition, it is necessary to write a predetermined loss waveform with high precision by superposing fundamental waveforms. That is, because the overlap integral value of the absolute value of the electric field between the core mode and the cladding mode in a range including photosensitive material needs to be large, by simply increasing the core radius ra, which is effective in reducing the bandwidth of the fundamental waveform, the writing ability would decrease. It is possible to perform coupling from the $LP_{01}$ mode to a higher-order mode by providing to only the optical cladding a periodic refractive index variation that is inclined relative to the wavefront of light of $LP_{01}$ mode. When rb is increased (the thickness of the optical cladding is increased), it becomes difficult to write a grating in the optical cladding around the core and the writing ability decreases. In order to increase the writing ability, the difference $\Delta nab$ between the relative refractive index $\Delta a$ of the core and the relative refractive index of the optical cladding $\Delta b$ should be reduced. However, with the refractive index profiles of conditions 25 and 34, bending loss becomes large and it is necessary to impose a limitation also on $\Delta nab$.

Next, a method for achieving both of reduction of the bandwidth of the fundamental waveform and writing ability will be described. As described above, increase of ra and rb reduces the bandwidth of the fundamental waveform and decreases the writing ability. As a result of examining a minimum necessary writing ability, the ratio of leakage of the power of the $LP_{01}$ mode to the optical cladding is larger than or equal to 18%. It is effective that rb/ra necessary for the writing ability is in the range of 3.0 to 4.0.

A refractive index profile that is necessary for reducing the bandwidth of the fundamental waveform while maintaining high writing ability is as follows. Here, rb/ra was 3.59. $\Delta b$ and $\Delta c$ for the core radius ra were calculated so that the ratio of the leakage amount of the $LP_{01}$ mode to the optical cladding was constant at each of 18%, 22%, and 28%. There is a concern that the bending loss may increase if $\Delta nab$ is reduced. The bending loss can be represented by using a MAC value (MFD/$\lambda c$), and the bending loss increases as the MAC value decreases. Therefore, in order to increase the cutoff wavelength λc and to suppress the influence of the bending loss, λc was set to be constant at 1.21 μm.

The variation of Ge on a straight line perpendicular to the central axis in the optical cladding from the core side to the jacket side is −0.013× (thickness of the optical cladding). The boundary between the core and the first cladding is defined as a position where the gradient of the refractive index is the maximum, and the boundary between the jacket and the optical cladding is defined as a position where the gradient of the refractive index between the optical cladding and the jacket is the maximum. Here, the approximate line of the refractive index profile in the first cladding is defined as a straight line that connects a refractive index at a position that is separated from the boundary between the core and the cladding toward the outside by 1 μm with respect to the core center and a refractive index at a position that is separated from the boundary between the jacket and the optical cladding toward the core center by 1 μm.

Figure 13:
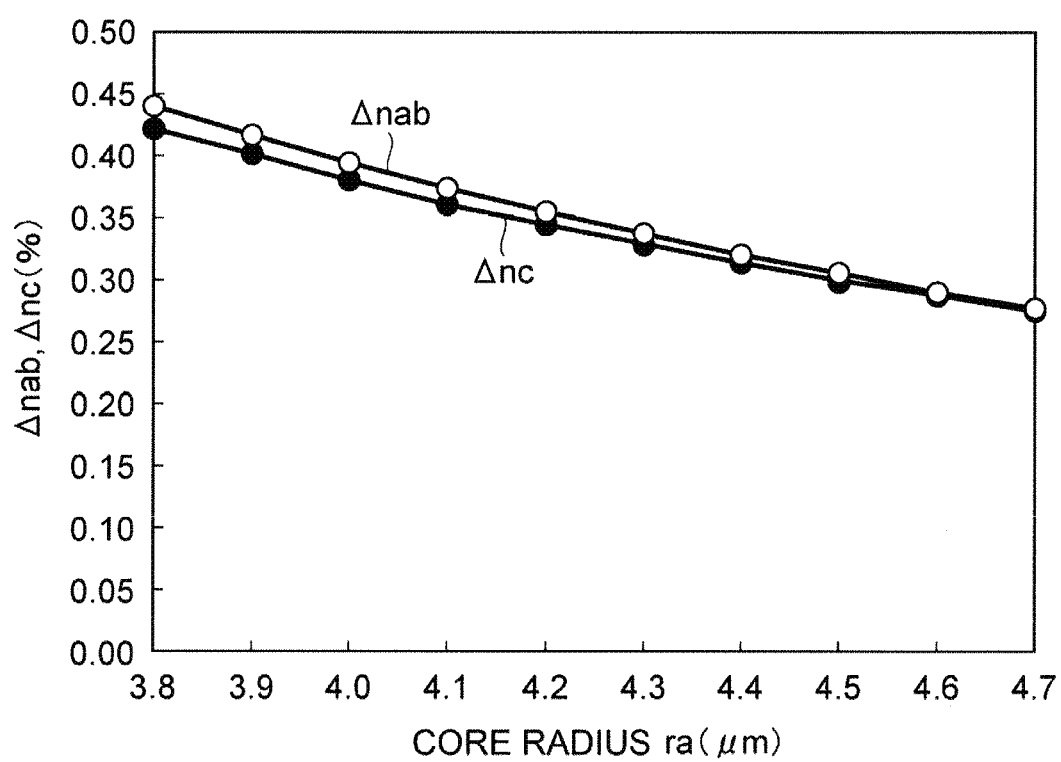
FIG. 13 is graph illustrating the results of calculating Δn and Δnc for the core radius ra in a case where the ratio of leakage of the $LP_{01}$ mode to the optical cladding is constant at 22%.

FIG. 13 is a graph illustrating the results of calculating Δnab and Δnc for the core radius ra in a case where the ratio of leakage of the $LP_{01}$ mode to the optical cladding is constant at 22%. Here, Δnc is the difference between the relative refractive index Δa of the core and the relative refractive index Δc of the jacket. As can be seen from this graph, Δnab and Δnc show similar trends and have approximately the same values. Hereinafter, only Δnab will be described.

Figure 14:
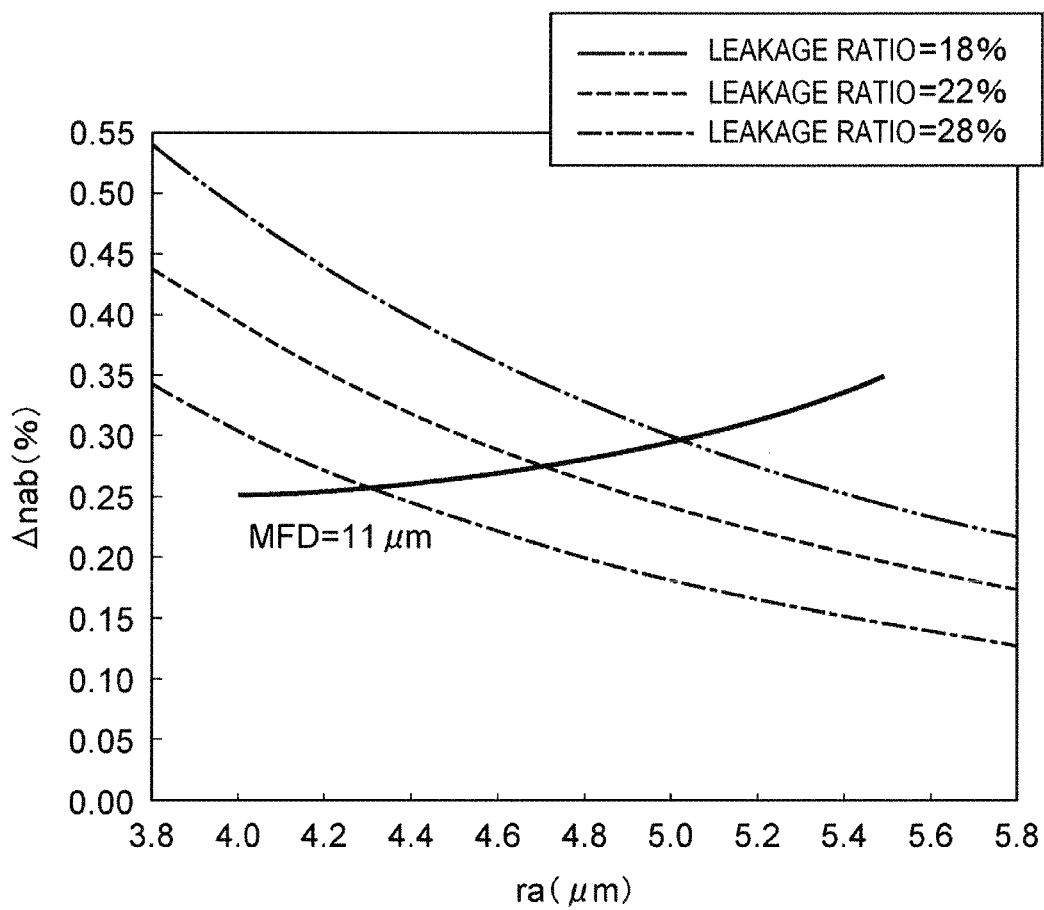
FIG. 14 is graph illustrating the results of calculating Δn for the core radius ra in a case where the ratio of leakage of the $LP_{01}$ mode to the optical cladding is constant at each of 18%, 22%, and 28%.

FIG. 14 is a graph illustrating the results of calculating Δnab for the core radius ra in a case where the ratio of leakage of the $LP_{01}$ mode to the optical cladding is at each of 18%, 22%, and 28%. As can be seen from this graph, as the core radius ra increases, Δab decreases. However, as described above, it is necessary to suppress the bending loss by using the MAC value, and, in addition, it is necessary that the MFD be smaller than or equal to 11 μm. In consideration of the restraint that the MFD is smaller than or equal to 11 μm it is necessary that Δnab be larger than or equal to 0.25%.

Figure 15:
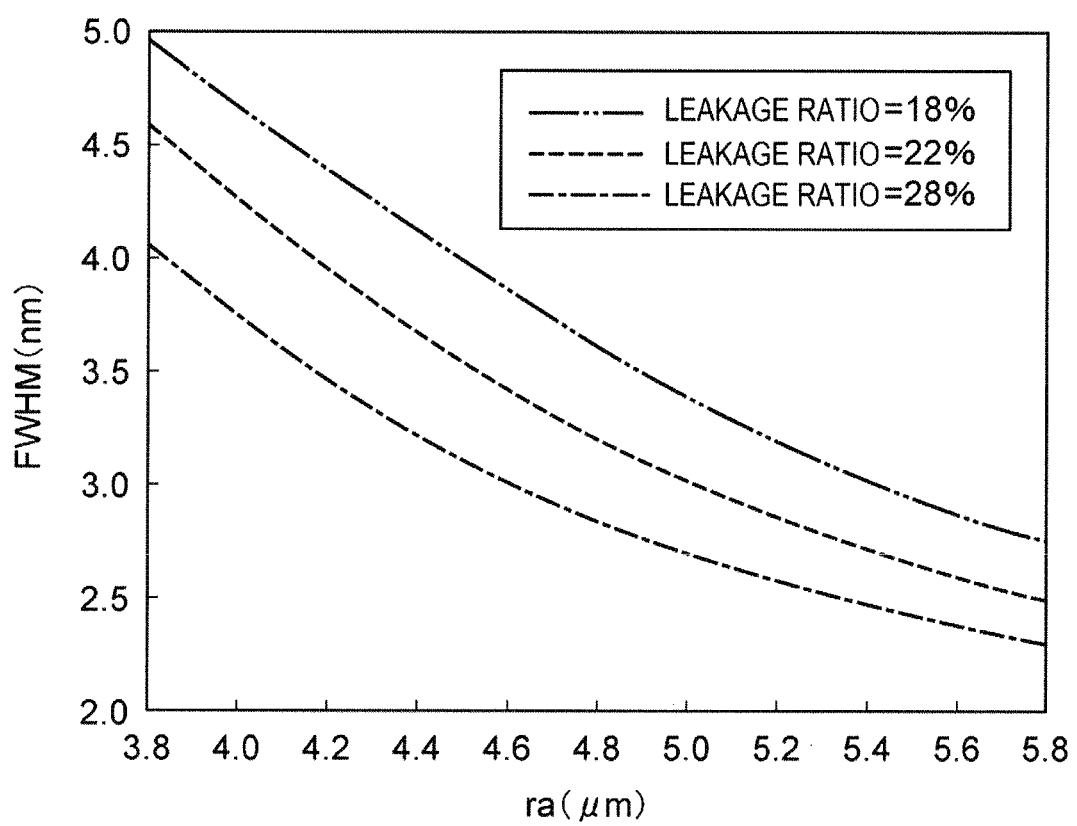
FIG. 15 is a graph illustrating the results of calculating the FWHM of the fundamental waveform for the core radius ra with the leakage ratio as a parameter.

FIG. 15 is a graph illustrating the results of calculating the FWHM of the fundamental waveform for the core radius ra. This graph shows the results of calculating the FWHM of the fundamental waveform by using parameters obtained from FIG. 14. It can be seen from this graph that the FWHM of the fundamental waveform decreases as the core radius increases.

Figure 16:
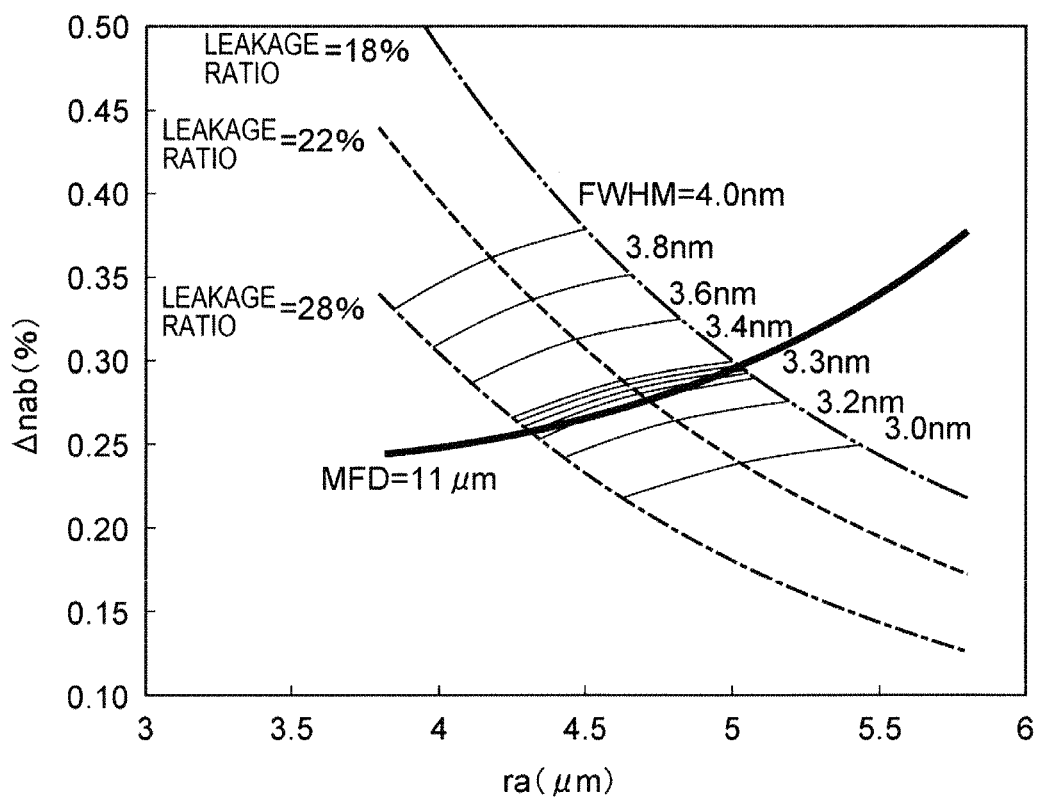
FIG. 16 is a graph illustrating the results of calculating the FWHM of the fundamental waveform for the core radius ra and Δn.

FIG. 16 is a graph illustrating the results of calculating the FWHM of the fundamental waveform for the core radius ra and Δnab. This graph is formed by integrating the calculation results shown in FIGS. 14 and 15. This graph shows cases where the FWHM of the fundamental waveform was each of 4.0 nm, 3.8 nm, 3.6 nm, 3.4 nm, 3.3 nm, 3.2 nm, and 3.0 nm. It can be seen that, in order to make FWHM smaller than or equal to 4.0 nm, Δnab needs to be in the range of 0.25% to 0.38% and the core radius needs to be in the range of 3.8 μm to 4.5 μm. It can be seen that, in order to make FWHM smaller than or equal to 3.4 nm, Δnab needs to be in the range of 0.25% to 0.30% and the core radius needs to be larger than or equal to 4.3 μm and smaller than or equal to 5.0 It can be seen that, in order to make FWHM smaller than or equal to 3.32 nm, it is appropriate that Δnab is in the range of 0.26 to 0.28% and the core radius is larger than 4.5 μm and smaller than or equal to 4.8 μm.

As heretofore described, by increasing the core radius ra of the optical fiber and reducing the difference Δnab between the relative refractive indices of the core and the optical cladding, it is possible to reduce the FWHM of the fundamental waveform and to flatten the gain of the EDFA with high precision by using the loss spectrum of the EDFA obtained by superposing a plurality of fundamental waveforms.

What is claimed is:

1. A slanted fiber grating including a Bragg grating in at least a partial region in an optical fiber, the optical fiber made of silica-based glass and comprising:
   a core that includes a central axis of the optical fiber and that has a radius ra that is larger than 4.3 μm and smaller than or equal to 5.0 μm;
   a first cladding that is in contact with the core, that surrounds the core, that has an outer radius rb, and that has a refractive index lower than a refractive index of the core; and
   a second cladding that is in contact with the first cladding, that surrounds the first cladding, and that has a refractive index lower than the refractive index of the core and higher than the refractive index of the first cladding,
   wherein at least a part of the first cladding contains a photosensitive material whose refractive index increases by irradiation with light,
   wherein, at the radius ra, a derivative of a refractive index with respect to a distance from the central axis along a straight line perpendicular to the central axis is minimum,
   wherein, in a graph in which the straight line perpendicular to the central axis is a horizontal axis and the refractive index is a vertical axis, a difference between a maximum value of the refractive index of the core and a value that an extension of a straight line connecting a refractive index at a radius of (ra+1 μm) and a refractive index at a radius of (rb−1 μm) takes at the radius ra is in a range of 0.25% to 0.30% relative to a refractive index of 1.444024, and
   wherein the photosensitive material is $GeO_2$.

2. The slanted fiber grating according to claim 1, wherein the first cladding and the second cladding of the optical fiber each contain fluorine.

3. The slanted fiber grating according to claim 1, wherein at the radius rb of the first cladding of the optical fiber, a derivative of a refractive index with respect to a distance from the central axis of the optical fiber along a straight line perpendicular to the central axis is maximum.

4. The slanted fiber grating according to claim 3, wherein the first cladding and the second cladding of the optical fiber each contain fluorine.

5. The slanted fiber grating according to claim 1, wherein the Bragg grating is formed in at least a partial region of the first cladding of the optical fiber in a direction of the central axis and is inclined relative to the central axis.

6. A slanted fiber grating including a Bragg grating in at least a partial region in an optical fiber, the optical fiber made of silica-based glass and comprising:
   a core that includes a central axis of the optical fiber and that has a radius ra that is larger than 4.3 μm and smaller than or equal to 5.0 μm;
   a first cladding that is in contact with the core, that surrounds the core, that has an outer radius rb, and that has a refractive index lower than a refractive index of the core; and
   a second cladding that is in contact with the first cladding, that surrounds the first cladding, and that has a refractive index lower than the refractive index of the core and higher than the refractive index of the first cladding, wherein at least a part of the first cladding contains a photosensitive material whose refractive index increases by irradiation with light, wherein, at the radius ra, a derivative of a refractive index with respect to a distance from the central axis along a straight line perpendicular to the central axis is minimum, wherein, in a graph in which the straight line perpendicular to the central axis is a horizontal axis and the refractive index is a vertical axis, a difference between a maximum value of the refractive index of the core and a value that an extension of a straight line connecting a refractive index at a radius of (ra+1 μm) and a refractive index at a radius of (rb−1 μm) takes at the radius ra is in a range of 0.20% to 0.30% relative to a refractive index of 1.444024, and wherein the photosensitive material is $GeO_2$.

* * * * *